United States Patent Office 3,074,916
Patented Jan. 22, 1963

3,074,916
LUBRICANT ADDITION AGENTS
Ellis K. Fields, Chicago, Ill., assignor to Standard Oil Company, Chicago, Ill., a corporation of Indiana
No Drawing. Filed Feb. 27, 1958, Ser. No. 717,837
12 Claims. (Cl. 260—78.5)

This invention relates to novel compositions of matter which are effective as viscosity index improvers and detergents in lubricant compositions. More particularly, the invention pertains to improved lubricant compositions containing the reaction products of hydrazoic acid with polymeric materials containing free carboxyl groups.

Within recent years it has become common practice to impart improved properties to lubricants through the use of various types of additives or addition agents. Lubricating oils employed in internal combustion engines such as automotive and diesel engines require the use of one or more addition agents to improve their serviceability under certain adverse operating conditions. Among the more important additives employed are the type which function to prevent the formation and accumulation of sludge and varnish-like coatings on pistons and cylinder walls of the engine. Such additives which have the property of maintaining clean engines are referred to as "detergent-type" addition agents. Other addition agents in common usage are known as "viscosity index improvers." These additives function to improve the viscosity-temperature characteristics of the lubricant in which they are employed, said relationship commonly being expressed in the art as the viscosity index of the oil.

It is an object of this invention to provide novel addition agents which when added to a lubricant will improve both the detergent properties and the viscosity index thereof. Another object is to provide lubricant compositions possessing improved detergency and viscosity-temperature characteristics. Other objects and advantages of the invention will become apparent in the following description thereof.

The above objects, among others, are achieved in accordance with this invention by incorporating in a lubricating oil from about 0.01% to about 10% of an oil soluble addition agent which is the product of reaction between hydrazoic acid (HN$_3$) with an oil soluble partially esterified copolymer derived from (A) an unsaturated dicarboxylic acid having from 4 to 5 carbon atoms in the molecule and (B) at least one vinylidene compound copolymerizable therewith, wherein a portion, preferably from about 25% to about 95%, of the total number of carboxyl groups of the dicarboxylic acid in the polymer is esterified with at least one aliphatic alcohol having from about 2 to about 22 carbon atoms in the molecule, the mole ratio of the dicarboxylic acid or ester thereof to the vinylidene compound in the copolymer being within the range from about 1:100 to about 1:1. The reaction between the hydrazoic acid and the copolymer is carried out at a temperature within the range from about 0° C. to about 125° C. and preferably within the range from about 35° C. to 55° C., in the presence of an acid reacting catalyst, hereinafter defined, using from about 1 to about 4 moles of hydrazoic acid per mole of free carboxyl group in the copolymer. I have discovered that the reaction with hydrazoic acid increases the VI improving properties of the copolymer and in addition imparts detergent properties to the product, thus resulting in a single additive useful as a viscosity index improver and detergent for use in lubricating oils.

The copolymer used as a reactant in forming the products of the present invention is a copolymer of a dicarboxylic acid having from 4 to 5 carbon atoms in the molecule with a comonomer or mixture of comonomers capable of addition copolymerization with said dicarboxylic acid. In the copolymer some of the carboxyl groups of the dicarboxylic acid are esterified with an alcohol having from about 2 to about 22 carbon atoms. Such a partially esterified copolymer can be made in a number of ways, all of which fall within the scope of the invention. The simplest and most direct method, and consequently the preferred method for purposes of the invention, comprises partially esterifying the dicarboxylic acid in a preliminary step and thereafter copolymerizing the resultant product with the comonomer. Another method involves copolymerizing the dicarboxylic acid per se with the comonomer and thereafter partially esterifying the resultant copolymer. In still another method, the diester of the dicarboxylic acid is copolymerized with the comonomer and the resultant copolymer is hydrolyzed to the desired extent. Regardless of the method employed in making them, the copolymers which are preferred for use in the invention are those in which from about 25% to about 95% of the carboxyl groups of the dicarboxylic acid in the copolymer are esterified, and particularly preferred are those copolymers in which about 50% of these groups are esterified, e.g., a copolymer of the mono-ester of the dicarboxylic acid. For convenience in the following discussion the term "acid ester" will be used to designate the monomer corresponding to the dicarboxylic acid or derivative thereof, which monomer provides the free carboxyl groups in the copolymer. It should be understood, however, that this term is not intended to be limiting and, unless otherwise specified, includes within its scope both the dicarboxylic acid per se and the diester of such acid when these materials are used to form the copolymer in accordance with the alternative procedures given above.

The dicarboxylic acid used in this invention can be any ethylenically unsaturated dicarboxylic acid having from 4 to 5 carbon atoms in the molecule. Examples of suitable acids are maleic, fumaric, citraconic, mesaconic, and itaconic acids, of which maleic and fumaric are preferred.

The acid esters used in this invention will not readily homopolymerize, but they can be copolymerized with other monomers by methods well known in the art. In general, the monomers which will copolymerize with these acid esters are characterized by having ethylenic unsaturation, that is, they contain a non-aromatic

group. The preferred monomers are those containing a terminal ethylenic group, i.e., a

group, wherein at least one of the valence bonds is linked to a negative group, and the other bond is linked to hydrogen or hydrocarbon group. The preferred comonomers may therefore be defined as vinylidene compounds (which term is intended to include vinyl compounds) wherein there is attached to the vinylidene group at least one negative group, such as an aryl group (for example, as in styrene, alpha-methyl styrene, chlorinated styrenes, 3-methyl styrene, 3,4,5-trimethyl styrene, etc.); an acyloxy group (vinyl acetate, vinyl butyrate, vinyl decanoate, vinyl octadecanoate, etc.); an alkoxy group (vinyl ethyl ether, vinyl butyl ether, vinyl decyl ether, vinyl octadecyl ether, etc.); an aroyloxy group (vinyl benzoate, vinyl toluate, etc.); an aryloxy group (vinyl phenyl ether, vinyl xylyl ethers, etc.); a carbalkoxy group (butyl acrylate, hexyl methacrylate, octyl acrylate, nonyl methacrylate, octadecyl acrylate, octadecyl methacrylate, etc.), etc. For use in preparing the lubricant additives of this invention, copolymers formed from comonomers containing only carbon and hydrogen atoms (for example, styrene and alkylated styrenes) or only carbon, hydrogen, and oxygen atoms (for example, unsubstituted vinyl esters and ethers) are preferred.

The preferred comonomers (i.e., vinylidene comonomers) can be used in admixture with other monomers containing internal ethylenic unsaturation which do not readily homopolymerize, but which will copolymerize with the acid ester and the vinylidene comonomers of the invention. Examples of such internally unsaturated compounds are alkyl diesters of butenedioic acids and alpha-methyl butenedioic acids in which each alkyl group contains from about 4 to about 22 carbon atoms and preferably from about 6 to about 12 carbon atoms. Thus, for example, a copolymer may be prepared for use in the invention in which the monomeric units are monodecyl maleate (the acid ester), styrene (the vinylidene compound), and di-iso-octyl fumarate (the internally unsaturated monomer). It should be recognized that in such a copolymer the diester of fumaric acid is not considered the acid ester of the invention in spite of its close chemical similarity thereto. Its function in the copolymer (in the absence of hydrolysis of the ester groups to form free carboxyl groups) is the same as that of the vinylidene compound, namely that of a building block in forming the polymer chain, rather than a reactive unit. Examples of other suitable internally saturated compounds are dibutyl maleate, didecyl maleate, dioctadecyl maleate and the corresponding esters of fumaric, citraconic, and mesaconic acids.

The alcohols used in forming the ester groups in the copolymeric material used in the invention are aliphatic alcohols containing from 2 to about 22, and preferably from 6 to about 18, carbon atoms in the molecule. Examples of suitable alcohols are butyl alcohol, hexyl alcohol, isooctyl, alcohol, 2-ethyl hexyl alcohol, decyl alcohol, tridecyl alcohol, heptadecyl alcohol, and octadecyl alcohol.

The copolymeric material containing free carboxyl groups is reacted with hydrazoic acid in accordance with the invention by dissolving the copolymer in a suitable solvent such as chloroform, hexane, benzene, or a mineral oil, and slowly adding hydrazoic acid to the solution over a period from about 10 minutes to one hour or more with stirring, at a temperature within the range from about 0° C. and 125° C., and preferably from about 35° C. to about 55° C., in the presence of an acid reacting catalyst. The quantity of hydrazoic acid used can range from about 1 mole to about 4 moles per mole of free carboxyl group in the copolymer. In view of the toxic and explosive nature of hydrazoic acid it is preferable to generate the same in situ by the reaction of an alkali or alkaline earth metal azide, such as sodium azide, potassium azide, lithium azide, barium azide, etc., with the acid catalyst or an added quantity of a strong acid. In such case the procedure outlined above can be followed, except that the azide is added slowly to the reaction mixture just as the hydrazoic acid would be. The order of addition of the reactants is not important. The procedure given above of adding the hydrazoic acid or azide to the copolymer and acid catalyst may be followed, or alternatively the acid catalyst may be added slowly to a mixture of the copolymer and the hydrazoic acid or azide, or a mixture of the copolymer and hydrazoic acid may be added slowly to the acid catalyst. In any case, stirring is continued after the complete addition of all reactants until all gas evolution ceases, i.e., for a period of about 1 to about 4 hours or more. At this time the reaction mixture is cooled to about room temperature and made alkaline with excess caustic. The organic layer is dried, filtered, and, if a volatile solvent is used, evaporated, resulting in the novel reaction products of the invention.

The catalyst used in the reaction may be any of a large number of acid reacting catalysts, preferred among which are the strong mineral acids such as concentrated sulfuric and the strong organic acids such as alkane sulfonic acids and benzene and toluene sulfonic acids. In addition to these, other catalysts which can be used, although not necessarily with equivalent results, are phosphorus trichloride, oxychloride, pentoxide, and pentachloride; stannic chloride; ferric chloride; aluminum chloride; thionyl chloride; sulfoacetic acid; phosphoric acid; etc. The quantity of catalyst to be used in the case of the preferred strong mineral and organic acids is about 300 to 1800 cc. per mole of hydrazoic acid. When other catalysts are employed, somewhat greater amounts may be required.

The copolymers used in forming the products of this invention must be oil soluble. To this end, the copolymeric material should have a molecular weight within the range from about 10,000 to about 125,000 and preferably from about 10,000 to about 70,000. It is also preferred that the comonomers used in forming copolymers with the acid esters each have from about 6 to about 30 carbon atoms, and preferably about 10 to about 24 carbon atoms in the molecule. In any given case, oil solubility can readily be increased by adjusting the ratio of the reactants so as to increase the proportion of the more soluble monomer in the copolymer, for example, the proportion of di-iso-octyl fumarate in a mixture of the same, styrene, and the acid ester, or by increasing the chain length of the substituent hydrocarbon groups, for example, the ester group when an acrylate or methacrylate is used as the vinylidene compound or the side chain when an alkyl styrene is used. Suitable mole ratios of acid ester to other monomers in the copolymer range from about 1:100 to about 1:2. When a mixture of vinylidene compounds and internally unsaturated compounds (e.g., butenedioic acid diesters such as maleates or fumarates) is used, the mole ratio of the vinylidene compounds to the other monomers should be within the range from about 1:2 to about 4:1 and preferably from about 1:1 to about 2:1 in order to insure the formation of a copolymer.

The copolymerization can be carried out by any of the methods known to the art, i.e., in bulk, in solution or in emulsion. Solution polymerization is preferred, however, since the subsequent reaction with hydrazoic acid is best carried out in the presence of a solvent, which can be the same solvent, e.g., benzene, hexane, or mineral oil, used in the copolymerization. A particularly useful expedient is solution polymerization in which the solvent is a lubricating oil similar to that in which the additive is to be used, e.g., an SAE 10 to SAE 30 base oil when the additive is to be used in an automotive crankcase oil. The reaction with hydrazoic acid can then be carried out with the copolymer in this solution, resulting in a concentrate of the final reaction product in oil solution which requires no purification and which is easily handled and dispensed.

In preparing the copolymers used in this invention, there can be employed as a catalyst any compound which is capable of providing stable free radicals under conditions of the reaction. Examples of such catalysts are peroxy compounds, for example organic peroxides, peroxy salts, hydroperoxides, etc. such as t-butyl peroxide, acetyl peroxide, cumene hydroperoxide, t-butyl hydroperoxide, ethyl peroxy carbonate, and the like, and azo compounds such as $\alpha,\alpha'$-azodiisobutyronitrile, dimethyl and diethyl $\alpha,\alpha'$-azodiisobutyrate, etc. Such initiators can be used in a concentration of about 0.001% to 1.0% by weight. In addition, polymerization may also be initiated by the use of ultra-violet light as well as by the use of heat alone.

In general, the range of polymerization reaction temperatures employed in producing the copolymers varies between about 40° C. and 175° C., and is preferably within the range from about 80° C. to about 140° C. It will be understood that the polymerization temperature selected will usually be varied according to the nature and amount of the particular monomers and catalysts, if any, used, and the molecular weight of the products which are desired. Likewise the time for polymerization will be dependent on similar factors and can range over a period from about 1 hour to about 60 hours, as will be apparent to one skilled in the art.

The following examples are illustrative of my invention, and are not intended to be limiting.

EXAMPLE 1

The preparation of the preferred mono-esters of dicarboxylic acid for use in forming the copolymers of the invention is illustrated by the preparation of mono-heptadecyl maleate, as follows: A mixture of 256.46 g. (1 mole) heptadecanol, 3,9-diethyl-tridecanol-6 (manufactured by Carbide and Carbon Chemical Corp.) and 98.06 g. (1 mole) maleic anhydride was stirred at 120° C. until all the maleic anhydride reacted and went into solution (1 hour), giving 354,5 g. mono-heptadecyl maleate, a viscous colorless liquid, $n_D^{22.3}$ 1.4642.

EXAMPLE 2

A mixture of 10.62 g. (0.03 mole) mono-heptadecyl maleate, 26.6 ml. (0.23 mole) styrene, 72.2 ml. (0.2 mole) di-iso-octyl fumarate, and 0.2 ml. t-butyl hydroperoxide was heated 16 hours at 100° C. and 24 hours at 130° C., giving a viscous, very light yellow copolymer, which had a specific viscosity (1% solution in toluene at 20° C.) of 0.155.

EXAMPLE 3

A solution of 100 g. of the copolymer of Example 2 in 250 ml. benzene was storred at 40–50° C. with 70 ml. alkane sulfonic acid and treated with 4 g. sodium azide in small portions over a period of 35 minutes, then stirred at 45° C. for 1 hour. The mixture was cooled to 5° C. by the addition of chipped ice, diluted wtih 600 ml. hexane, and made alkaline by the dropwise addition of excess aqueous 5% NaOH. The hexane layer was separated, dried over anhydrous sodium sulfate, filtered, and evaporated in vacuo, giving a tough, cream-colored polymer containing 0.129% N, having a specific viscosity (1% solution in toluene at 20° C.) of 0.12.

EXAMPLE 4

A mixture of 10 ml. mono-heptadecyl maleate, 15 ml. styrene, 35 ml. di-iso-octyl fumarate, and 0.1 ml. t-butyl hydroperoxide was heated at 100° C. for 8 hours and at 125° C. for 16 hours, giving a tough transparent copolymer. A solution of 30 ml. copolymer in 100 ml. benzene was stirred at 40–50° C. with 40 ml. alkane sulfonic acid while 2 g. sodium azide was added in small portions over a period of 20 minutes. The mixture was stirred an additional 30 minutes at 45° C., cooled to 5° C. by the addition of chipped ice, diluted with 50 ml. hexane, and made alkaline by the careful addition of excess 5% aqueous NaOH. The organic layer was separated, dried over anhydrous sodium sulfate, filtered, and evaporated in vacuo, giving a tough polymer containing 0.155% N, having a specific viscosity (1% solution in toluene at 20° C.) of 0.119.

EXAMPLE 5

A mixture of 10 ml. mono-heptadecyl maleate, 40 ml. n-lauryl methacrylate, and 0.1 ml. t-butyl hydroperoxide was heated 8 hours at 100° C. and 16 hours at 125° C., giving a light yellow copolymer. This copolymer was dissolved in 100 ml. benzene and stirred wtih 70 ml. alkane sulfonic acid at 45° C. while 4 g. sodium azide was added to the stirred mixture in small portions over a period of 25 minutes. The mixture was stirred 30 minutes more at 45° C., cooled by dilution with chipped ice, and made alkaline with excess 5% aqueous NaOH. 200 ml. hexane was added, the organic layer was separated, dried over anhydrous sodium sulfate, filtered, and evaporated in vacuo, giving a tough cream-colored polymer containing 0.183% N, having a specific viscosity (1% solution in toluene at 20° C.) of 0.269.

The reaction products of the above examples were tested for their effectiveness as viscosity index improvers at a concentration of 2% by weight in a solvent extracted SAE 5 base oil. The results are given in the following table.

Table I

| Additive: * | Viscosity index |
|---|---|
| None | 90 |
| Product of Example 2 | 110 |
| Product of Example 3 | 150 |
| Product of Example 4 | 128 |
| Product of Example 5 | 130 |

*2% in SAE 5 base oil.

The effectiveness of the products of the present invention in improving the detergency characteristics of lubricating oils is demonstrated by the data in Table II. These data were obtained by subjecting a hydrocarbon oil with and without the products of the above examples to the detergency and oxidation test known as the squalene Indiana Stirring Oxidation Test (I.S.O.T.) and to the carbon suspension test (C. B. Biswell et. al., Ind. Eng. Chem., 47, 1598, 1601 (1955)). In the squalene I.S.O.T. 10% by weight of squalene (a highly unsaturated reactive hydrocarbon that polymerizes easily and forms a tightly adhering varnish during the test) is added to the oil to be tested, and the mixture is heated at 300° F. in a 500 cc. glass beaker in the presence of 5 square in. of copper and 10 square in. of iron. Four glass rods of 6 mm. diameter are suspended in the oil which is stirred at about 1300 r.p.m. by means of a glass stirrer. After 72 hours the test is ended and varnish values are determined. Varnish values or ratings are based upon visual inspection of the glass rods, in which a rod free of any varnish deposit is given a rating of 10 while a badly coated rod is given a rating of 1. Rods having appearances between these extremes are given intermediate values. The products of this invention were tested at 2% by weight concentration in a solvent extracted SAE 30 base oil containing 0.75% of sulfurized dipentene. In the carbon suspension test the products were tested at 0.5% concentration in 70 cc. kerosene with three grams of a paste containing 20% carbon black in a heavy white oil base, stirring the mixture five minutes in a 100 cc. graduate in a Herschel demulsibility tester at room temperature (25° C.). After 5 days (120 hours), the percentage of carbon black which had settled out was recorded.

Table II

| Product | Charcoal suspension test—percent charcoal settled after 120 hours | Squalene ISOT—varnish rating |
|---|---|---|
| None | 90 (in 4 hours) | 5 |
| Example 2 | 50 (in 24 hours) | |
| Example 3 | 0 | 10 |
| Example 4 | 0 | 9 |
| Example 5 | 0 | 9 |

It can be seen that the reaction with hydrazoic acid in accordance with the invention increases the effectiveness of the copolymers as viscosity index improvers and in addition imparts detergent properties thereto. This is shown by comparison in Tables I and II of the product of Example 2 with that of Example 3, which indicates that the reaction with hydrazoic acid improved the effectiveness of the additive to the extent that the viscosity index of a 2% solution thereof in a lubricating oil increased from 110 to 150. Moreover, before reaction with hydrazoic acid, the additive had practically no detergent properties, whereas after reaction it was a highly efficient detergent.

The products of this invention can be used in lubricating oils in concentrations of from about 0.01% to about 10% and preferably from about 0.5% to about 5% by weight. Although the present invention has been illustrated by the use of these products in mineral lubricating oils it is not restricted thereto. Other lubricating oil bases can be used, such as hydrocarbon oils, both natural and synthetic, for example, those obtained by the polymerization of olefins, as well as synthetic lubricating oils of the alkylene oxide type and the polycarboxylic acid ester type, such as the oil soluble esters of adipic acid, sebacic acid, azelaic acid, etc. It is also contemplated that various other well known additives, such as antioxidants, anti-foaming agents, pour point depressors, extreme pressure agents, antiwear agents, etc., may be incorporated in lubricating oils containing the additives of my invention.

Concentrates of a suitable oil base containing more than 10%, for example up to 50% or more, of the copolymers of this invention alone or in combination with other additives can be used for blending with hydrocarbon oils or other oils in the proportions desired for the particular conditions of use to give a finished product containing from about 0.01% to about 10% of the reaction products of this invention.

Unless otherwise stated, the percentages given herein and in the claims are percentages by weight.

While I have described my invention by reference to specific embodiments thereof, the same are given by way of illustration only. Modifications and variations will be apparent from my description to those skilled in the art.

Having described my invention, I claim:

1. The product obtained by the reaction, at a temperature within the range from about 0° C. to about 125° C., of hydrazoic acid with an oil soluble copolymeric material, said copolymeric material resulting from the copolymerization of (A) an unsaturated dicarboxylic acid having from 4 to 5 carbon atoms in the molecule and (B) at least one vinylidene compound copolymerizable therewith, said copolymeric material having a plurality of free carboxyl groups and a plurality of ester groups in which the alcohol residues are alkyl groups having from about 2 to about 22 carbon atoms per group, the mole ratio of units of said dicarboxylic acid to units of said vinylidene compound in said copolymeric material being within the range from about 1:100 to about 1:1, the quantity of hydrazoic acid used in said reaction being within the range from about 1 to about 4 moles per mole of free carboxyl group in said copolymeric material, said reaction being carried out in a reaction mixture containing an acid reacting catalyst.

2. The product of claim 1 wherein from about 25% to about 95% of the carboxyl groups in said copolymeric material are esterified.

3. The product of claim 1 wherein said copolymeric material is a copolymer of a mono-ester of a butenedioic acid and said vinylidene compound and wherein the alcohol residue in the ester group of said monoester is an alkyl group having from about 6 to about 18 carbon atoms.

4. The product of claim 1 wherein said dicarboxylic acid is maleic acid.

5. The product of claim 1 wherein said dicarboxylic acid is fumaric acid.

6. The product of claim 1 wherein said vinylidene compound is styrene.

7. The product of claim 1 wherein said vinylidene compound is an ester of acrylic acid.

8. The product of claim 1 wherein said vinylidene compound is an ester of methacrylic acid.

9. A lubricant composition comprising a major proportion of a lubricating oil and a minor proportion, sufficient to improve the detergent qualities and viscosity index of said composition, of the product of claim 1.

10. A lubricant composition comprising a major proportion of a lubricating oil and from about 0.01% to about 10% by weight of the product of claim 3.

11. A lubricant composition comprising a major proportion of a hydrocarbon oil and from about 0.5% to about 5% of the product of claim 4.

12. An addition agent concentrate for lubricating oils, comprising esesntially a hydrocarbon oil containing more than 10% of the product of claim 1, said concentrate being capable of dilution with a lubricating oil to form a homogeneous mixture containing from about 0.01% to about 10% of said product.

References Cited in the file of this patent

UNITED STATES PATENTS

| | | |
|---|---|---|
| 2,047,398 | Voss et al. | July 14, 1936 |
| 2,599,123 | Pinkney et al. | June 3, 1952 |
| 2,616,853 | Giammaria | Nov. 4, 1952 |
| 2,671,773 | Giammaria | Mar. 9, 1954 |
| 2,727,862 | Giammaria | Dec. 20, 1955 |

OTHER REFERENCES

Degering: Outline of Organic Nitrogen Compounds, University Lithographers, Ypsilanti, Mich., 1950, p. 283.